United States Patent [19]
Wong et al.

[11] Patent Number: 5,453,623
[45] Date of Patent: * Sep. 26, 1995

[54] POSITRON EMISSION TOMOGRAPHY CAMERA WITH QUADRANT-SHARING PHOTOMULTIPLIERS AND CROSS-COUPLED SCINTILLATING CRYSTALS

[75] Inventors: Wai-Hoi Wong, Houston, Tex.; Jorge Uribe, Manizales, Colombia

[73] Assignee: Board of Regents, The University of Texas System, Austin, Tex.

[*] Notice: The portion of the term of this patent subsequent to Jun. 7, 2011 has been disclaimed.

[21] Appl. No.: 251,877

[22] Filed: Jun. 1, 1994

Related U.S. Application Data

[63] Continuation-in-part of Ser. No. 882,344, May 13, 1992, Pat. No. 5,319,204.

[51] Int. Cl.$^6$ .................................................. G01T 1/20
[52] U.S. Cl. ................................ 250/363.03; 250/363.04
[58] Field of Search ...................... 250/363.03, 363.04, 250/363.06

[56] References Cited

U.S. PATENT DOCUMENTS

| | | |
|---|---|---|
| 4,733,083 | 3/1988 | Wong . |
| 4,743,764 | 5/1988 | Casey et al. . |
| 4,883,966 | 11/1989 | Wong . |
| 5,032,728 | 7/1991 | Chang et al. . |
| 5,091,650 | 2/1992 | Uchida et al. . |
| 5,319,204 | 6/1994 | Wong ................................ 250/363.03 |

OTHER PUBLICATIONS

Digby, et al., "Detector, Shielding and Geometric Design Factors for a High-Resolution PET System," *IEEE Trans. on Nucl. Sci.*, vol. 37, No. 2, pp. 664–670 (Apr. 1990).

Muehllehner, et al., "A Hexagonal Bar Positron Camera: Problems and Solutions," *IEEE Trans. on Nucl. Sci.*, vol. NS–30, No. 1, pp. 652–660 (Feb. 1983).

Chang, Wei, et al., "A Multi-Detector Cylindrical Spect System for Phantom Imaging," *IEEE*, 90CH2975, pp. 1208–1211 (1990).

Wong, Wai-Hoi, et al., "A Slanting Light-Guide Analog Decoding High Resolution Dector for Positron Emission Tomography Camera," *IEEE Trans. on Nucl. Sci.*, vol. NS–34, pp. 280–284 (1987).

Wong, Wai-Hoi, et al., "Characteristics of Small Barium Fluoride Scintillator for High Intrinsic Resolution Time-of-Flight Positron Emission Tomography," *IEEE Trans on Nucl. Sci.*, vol. NS–31, pp. 381–386 (1984).

*Primary Examiner*—Constantine Hannaher
*Assistant Examiner*—Richard Hanig
*Attorney, Agent, or Firm*—Arnold, White & Durkee

[57] ABSTRACT

A positron emission tomography camera is provided having an array of scintillation crystals placed adjacent other arrays to form an arcuate detection surface surrounding a patient area. Alternatively, the arrays may be placed in a planar configuration on opposing sides of the patient area. Either a three-dimensional image or a two-dimensional image can be formed from a patient's body placed within the patient area. Moreover, the edges between the arrays of crystals are offset in relation to the edges between the light detectors, allowing use of circular photomultiplier tubes instead of the more expensive square photomultiplier tubes. Each light detector is suitably positioned adjacent four adjacent quadrants of four respective arrays to detect radiation emitted from the four quadrants of each array. According to one aspect of the present invention, the crystals within the arrays are selectively polished and selectively bonded to adjacent crystals to present a cross-coupled interface which can tunably distribute light to adjacent light detectors. According to another aspect of the present invention, the crystal arrays are formed by optically bonding slabs of crystals (which may be optically treated for light control) into a "pre-array" and then cross-cutting the "pre-array" from one or more sides to form the final array. The grooves may be optically treated, such as with white reflective fillers, for further optical control within the array. In addition, optical jumpers may be coupled to the free end of the array to correct for decoding distortion.

32 Claims, 12 Drawing Sheets

POSITRON EMISSION TOMOGRAPHY CAMERA WITH QUADRANT-SHARING PHOTOMULTIPLIERS AND CROSS-COUPLED SCINTILLATING CRYSTALS

This application is a continuation-in-part of application Ser. No. 07/882,344, filed May 13, 1992, now U.S. Pat. No. 5,319,204.

BACKGROUND OF THE INVENTION

1. Field of the Invention

This invention relates to gamma or positron emission tomography (PET) cameras. This invention also relates to an improved light distribution method for reducing the costs associated with manufacturing the crystal arrays for the PET cameras.

2. Background

A PET camera typically consists of a polygonal or circular ring of radiation detection sensors 10 placed around a patient area 11, as shown in FIG. 1. Radiation detection begins by injecting isotopes with short half-lives into a patient's body placeable within patient area 11. The isotopes are absorbed by target areas within the body, causing the isotope to emit positrons that are detected when they generate gamma rays. When in the human body, the positrons collide with electrons and the two annihilate each other, releasing gamma rays. The emitted rays move in opposite directions, leave the body and strike the ring of radiation detectors 10.

The ring of detectors 10 includes an inner ring of scintillation crystals 12 and an outer ring of light detectors or photomultiplier tubes 14, shown in FIG. 2. The scintillation crystals respond to the incidence of gamma rays by emitting a flash of photon energy (scintillation) that is then converted into electronic signals by a corresponding adjacent photomultiplier tube 14. A computer records the location of each energy flash and then plots the source of radiation within the patient's body by comparing flashes and looking for pairs of flashes that arise from the same positron-electron annihilation point. It then translates that data into a PET scan image. The PET monitor displays the concentration of isotopes in various colors indicating level of activity. The resulting PET scan image indicates a transaxial view of neoplasms or tumors existing in the patient's body.

Early PET scanners required a single photomultiplier tube to be coupled to a single scintillation crystal. A crystal can be made very narrow (e.g., 1 mm). The thinner the crystal, the greater the resolution of the PET camera. However, narrow crystals are useful only if the crystal location can be accurately decoded. The smallest available photomultiplier tube (PMT) is somewhat large by comparison (e.g., 10 mm). Hence, a practical advance in PET scanners allows a single PMT to service several crystals. As disclosed in my U.S. Pat. Nos. 4,733,083 and 4,883,966, a single PMT can service several crystals. Because PMTs are relatively expensive (a single PMT may alone cost between $250 and $650), minimizing the number of PMTs can drastically reduce the cost of the PET camera.

As shown in FIG. 3, two PMTs 14a and 14b can service a row of eight scintillation crystals 12 in a known design. The eight crystals are formed from a unitary crystal block 16. As described in U.S. Pat. No. 4,743,764, each crystal 12 is formed by placing slots or cuts 18 at varying depths into block 16. The depth of each cut determines the amount of photon energy being directed to a respective PMT 14a or 14b. For example, crystal 12a is formed having a cut 18 placed the entire depth of block 16 and separating crystal 12a from crystal 12b. Photon energy generated within crystal 12a is directed entirely into the right-side PMT 14a. Typically, cut 18 is filled with light reflecting materials or the sides of the cut are polished so as to effectively prevent photon energy from passing across cuts. Shortening the depth of cut 18 will allow photon energy to be directed along the shortened cut distance and then disperse past the cut edge. For example, photon energy within crystal 12b will disperse toward the center of the block to both PMT 14a and 14b. Photon energy will predominantly strike PMT 14a; however, some energy will strike PMT 14b due to the absence of the cut extending the entire depth of the left hand side of crystal 12b.

The layout of scintillation crystals 12 is in three dimensions. FIG. 3 illustrates the x and z axes of eight crystals within a single block 16. However, FIG. 4 illustrates the x and y axes of four blocks 16, each block adjacent four PMTs 14. Typically an array of crystals are formed between cuts within a block. The blocks are then joined side-by-side to preferably form a ring surrounding the patient area. In two dimensions (x and y), a single PMT 14 can, for example, service sixteen crystals 12 (i.e., a 4×4 array of crystals 12) as shown in FIG. 4. Likewise, four PMTs can service a block or 8×8 array of crystals.

Shown in FIGS. 2-4 are various conventional crystal/PMT arrangements, which typically involve placement of the outer edge of a PMT adjacent to and aligned with the outer edge of an array of crystals 12 (or edge of a block 16). For purposes of isolating the specific crystal being scintillated, it is important that the photon energy sent to the respective PMT identify where, within the array of crystals serviced by the PMT, that the scintillation occurred. Scintillation occurring within one crystal is often directed to one of many PMTs associated with the entire block of crystals. In FIG. 4, for example, if crystal H is scintillated, then all photon energy will be directed to PMT 14b due to the cut being the entire depth of the crystal block as shown in FIG. 3. If crystal N is scintillated, then photon energy will be primarily directed to PMT 14b; however, PMT 14a, 14e and 14f will also receive photon energy. If the location of scintillation is nearer the center of the array (e.g., crystal C' is scintillated), then PMT 14b will read only slightly more photon energy than PMTs 14a, 14e and 14f. By determining the relative amounts of photon energy received by four PMTs associated with a single array or block, the relative X and Y location of scintillation can be determined within that array or block, the resolution of the X and Y location being directly proportional to the width of each crystal 12. Of course, it is implicit that the system must be capable of decoding the crystal locations.

The scintillation light from one crystal is distributed to four PMTs for decoding the position from that crystal by comparing the ratio of scintillation signal received by the four PMTs as follows:

$$X\text{-position} = \frac{a+e}{a+b+e+f}$$

$$Y\text{-position} = \frac{a+b}{a+b+e+f}$$

where a, b, e, and f are the amount of scintillation signal received from each of the four PMTs 14a, 14b, 14e, and 14f in FIG. 4. For example, when the corner crystal A, detects a gamma ray, both the X-position and Y-position will be near maximum (= 1.0) because almost all of the scintillation light goes to PMT 14a and very little light will be distributed to the other three PMTs 14b, 14e, and 14f. Another example is when crystal B' detects a gamma ray. The scintillation light will be equally distributed to all four PMTs (14a, 14b, 14e, and 14f); the X-position will be approximately equal to 0.5 and the Y-position will also be close to 0.5.

Unfortunately, with the outer edge of the array being aligned with and adjacent to the outer edge of the PMTs (i.e., two sides of each PMT), there is an upper limit on the size of the PMT in relation to the size of the array. If, for example, two (as opposed to four) PMTs service a single array, then predominate photon energy in one PMT indicates that scintillation occurred at the left (or upper) half of the array as opposed to the right (or lower) half. Thus, only single axis (e.g., X axis) detection is possible. Single axis detection is not sufficient to identify with precision the exact location of scintillation within the block or array. Rather, a double-axis detection scheme is needed whereby both the X and Y location of each scintillation is detectable. If, for example, a single PMT services a single array, no indicia whatsoever of the location scintillation with the array can be determined. The PMT cannot differentiate where, within the serviced array, the scintillation occurred. Thus, as long as conventional detection schemes utilize "non-offset" PMT/ array edges, the number of PMTs per array cannot be effectively decreased.

SUMMARY OF THE INVENTION

Problems outlined above are in large part solved by the device and method of the present invention. That is, the PET camera of the present invention is constructed of multiple scintillating crystal arrays placed adjacent to a plurality of PMT arrays. The crystal arrays and the PMT arrays are offset in both the x and y axes such that each crystal array is directly adjacent and optically coupled to four adjacent quadrants of four adjacent PMTs. The quadrant-sharing scheme of the present invention can be used to reduce the number of PMTs needed, thereby reducing the cost of the PET camera. Alternatively, the quadrant-sharing scheme may be used to decrease the size of each scintillating crystal to achieve higher spatial resolution without increasing the number of PMTs.

Broadly speaking, the present invention is directed to a PET camera comprising a plurality of arrays of scintillation crystals. The arrays may be placed in an arcuate or inwardly angled position with adjacent arrays to surround a patient area and detect radiation emitted from the patient area. Alternatively, the arrays may be placed in a planar position with adjacent arrays. A pair of resulting planes can be placed on opposing side of the patient area. A light detector, such as a PMT, may be positioned adjacent one quadrant of each of four adjacent arrays to detect radiation emitted from each array. The edge of each array is in an offset position relative to the edge of each PMT.

One significant aspect of multiple, individual arrays, as opposed to a single array with proportionally multiple times more scintillation crystals, is that light spread may be controlled by the boundaries of the arrays. This is important to reduce the dead time for each light detector that briefly follows detection of a gamma ray. If light is allowed to spread to more crystals, that same light will be detected by more light detectors, resulting in more light detectors being briefly "dead" and unresponsive to reception of new gamma rays.

The present invention controls the light spread to an acceptable boundary through the use of individual arrays. By localizing the light spread, fewer light detectors are needed to decode a given area of crystals in the non-modular light detector arrangement in this invention.

Another significant reason for using multiple arrays as in the present invention, in contrast to a single array with proportionally multiple times more crystals, is because scintillation light distribution is not identical for each scintillation occurrence. Rather, the distribution is largely determined statistically by the number of photons generated in a scintillation event. The mean of the statistics can be very precise if the light distribution method is accurately controlled.

For detection of a positron gamma ray (511 KeV), the statistical uncertainty allows only 6–8 BGO or light-output-equivalent crystals to be decoded in each dimension, or 36–64 BGO or light-output-equivalent crystals in a two-dimensional array, even if the light distribution method is precise. Therefore, simply cutting an array into a larger number of finer crystals would not achieve greater resolution without enough statistical accuracy to differentiate two adjacent crystals.

According to a preferred embodiment of the present nonmodular invention, at least 36–64 BGO or light-output-equivalent crystals may be decoded, but only 4×¼=1 light detector is used for the decoding, achieving 36–64 crystals per light detector. The present invention achieves this high resolution through the imposition of small arrays and placement of the array boundaries and corners at the mid-lines and centers (respectively) of the light detectors.

Conventional detector designs, in contrast, use four light detectors to decode only 36–64 BGO or light-output-equivalent crystals, achieving only 9–16 crystals per detector. Hence, with the same size detectors, the present invention can decode four times as many crystals as conventional designs (or each crystal is one-fourth the size of the crystals in conventional designs), which results in a much higher image resolution.

A further advantage of the present invention is its cost savings. The most significant component cost of a PET camera is the cost of the PMTs. By making possible use of relatively inexpensive, standard circular PMTs, which are roughly half the price of square PMTs, the offset design of the present invention can reduce the cost of a PET camera by 50%. Convenience is also increased, as circular PMTs are available from may manufacturers, whereas square PMTs are currently available from only a single manufacturer.

The use of circular PMTs allows yet another degree of freedom for fine tuning the performance of the decoding process (resolution); namely, the angle of rotation of the PMT relative to the array may be optimized. All PMTs (circular or square) have nonisotropic uniformity in sensitivity over the light-detection surface. The nonuniformity patterns are generally the same for different samples of the same PMT model. However, square PMTs have less rotational freedom relative to the array than do circular PMTs. In the circular PMT case, all of the PMTs can be rotated to a fixed relationship between their internal structures and the crystal array. In other words, the circular PMTs may be aligned for optimal sensitivity where higher resolution over the array is desirable. To compensate for the PMT systematic nonuniform pattern, the crystal array may be shifted slightly by fractions of a millimeter away from the true center position of the quadrant-sharing geometry.

In prior designs, the circular PMTs cannot be used because the corner crystals will be neglected. For example, as shown in FIG. 9, crystal 1-1 will not be covered by PMT 30a, which is designated to receive all of the scintillation light from that crystal. Similarly, light from many of the crystals on the edges will also escape detection. Further, the geometry of the PMT itself leads to further detection problems for the configuration shown in FIG. 9. Specifically, the circular PMT is a vacuum tube (area 33 in FIGS. 9 and 10) sealed inside a cylindrical wall 34, which has no light-detection sensitivity. This worsens the corner and edge-crystal problem discussed above when using circular PMTs.

Using quadrant-sharing, the present invention obviates the above problems associated with circular PMTs. As shown in FIG. 10, the corner crystal 1-1 is now sitting at the center of the designated light receiving PMT 30a, and has no coverage problems as noted for the configuration of FIG. 9. The center crystal 4-4 also has no detection problems because its light is to be distributed through the neighboring crystals to all four PMTs 30a, 30b, 30c, and 30d.

One advantage of symmetrical offsetting according to the present invention is that each light detector is doing quadruple duty over a non-symmetrical design; thus, the number of light detectors required is reduced by a factor of four over a non-symmetrical design. The present invention thus has four times as many decodable crystals per PMT over a non-symmetrical design as a result of the symmetrical offsetting.

Symmetrical (or two-dimensional) offsetting, however, is feasible only if the light distribution method through the scintillation crystal matrix is precise and symmetrical over both dimensions. The present invention achieves precise light control by use of plural matrices as well as a selective bonding and polishing process for individual crystals to achieve precise and symmetrical light distribution.

As one form of light control, the present invention contemplates treating the crystals in the empty space 36 between the four circular PMTs 30a, 30b, 30c, and 30d with optically reflective material, such as white paint. Any scintillation light going to the empty space 36 will thus not be lost but will be bounced back into the crystal 4-4 to be distributed through the neighboring crystals to all four PMTs 30a, 30b, 30c, and 30d.

Decoding distortion is common to all analog decoding detector designs, and is known to be higher with circular PMTs. Therefore, according to one aspect of the present invention, optically transparent jumpers may be optically coupled to the free end of the array to correct for decoding distortion, as shown in FIG. 15. The jumpers may be in forms of strips, rings, or slabs of an optically transparent material, such as glass or Plexiglas.™ To avoid light loss outside the array, the opposing and side surfaces of the jumpers may be treated with reflective material, such as white paint.

According to another aspect of the present invention, crystals within each array are tightly packed and coupled together to form a highly efficient gamma ray detecting surface. The adjoining surface of each crystal may have a polished or non-polished finish placed at select locations upon the surface depending upon the specific location of the crystal within the block and the targeted cross-coupling of light between crystals. Optical adhesives may also be selectively placed between crystals to couple the crystals within the array and, depending upon where the adhesives are placed, to fine-tune the cross-coupled light distribution to the PMT. Thus, the present embodiment does not require grooves be placed into the block via conventional saw blades, etc. Instead, the block or array of the present invention is formed by tightly bonding separate crystal elements together to form the array. By selectively polishing the adjacent surfaces of separate crystals and then selectively bonding those surfaces with light controlling adhesives, the crystals of the resulting array are optically cross-coupled with substantially no gaps therebetween. The cross-coupling scheme of the present embodiment is advantageously used to increase the radiation detection efficiency of the crystals by substantially limiting the gaps between the crystals.

The use of individual crystals may, however, be prohibitively expensive from a production standpoint. For example, for 8×8 arrays of tiny (e.g., $W_c \times L_c \times H_c = 1.5 \times 2.8 \times 10$ mm) crystals, approximately 30,000 to 60,000 individual crystals must be selectively optically coupled to each other. Therefore, according to another aspect of the present invention, slabs of cut crystals are used.

To form the detector array of cut crystals according to the present invention, slabs of crystals are cut. The thickness of each slab cut is equal to the smallest dimension of the desired crystal (e.g., 1.5 mm for the crystal sizes discussed herein). For an 8×8 array, eight of these slabs are then stacked so that the stack forms the "pre-array" with the same dimension as the desired final array (e.g., $W_A \times L_A \times H_A = 12 \times 24 \times 10$ mm for the arrays discussed herein). Prior to joining the slabs in the pre-array, it is desired according to the present invention that one or more of the interfacing surfaces of the slabs be optically treated, such as by roughing the surfaces, polishing them or painting them white. In addition, the interfacing surfaces may be partially blocked with a very thin barrier of optically reflective (e.g. white) material, using single or multiple strips uniformly across the whole slab along the dimension that is parallel to the axis of the camera/patient. These blocking barriers or strips may be shaped in various configurations (such as curved or slanted) to direct the light within the array as desired. Preferably, the strips are used to allow more light leakage near the array edges.

Once all of the slabs have been optically treated as desired, the slabs are optically glued rigidly together with a light controlling adhesive to complete the "pre-array." The slabs in the pre-array are then cross-cut to make the final array, with varying or uniform depth, as desired to control the light leak across the cut. The final arrays thus each comprise crystal slabs optically coupled together along a first axis, with spaced cuts across the slabs at uniform or varying depths along a second, perpendicular axis. All cuts may be made simultaneously in one pass with a custom-made saw assembly with multiple blades. The cuts may be made all from the same side of the array, or from opposite sides in an alternating pattern.

According to one aspect of the present invention, each array may comprise at least 36 scintillation crystals. Accordingly, a single PMT can service four adjacent arrays associated with at least 4×36=144 crystals. As such, the present invention contemplates a large PMT equal in size to four quadrants of an array (or a single array). By offsetting the PMT/array edges in relation to each other, PMT size can therefore be increased over conventional designs thereby reducing the number of PMTs needed.

According to another aspect of the present invention, instead of increasing the PMT size, PMTs may be left small but are capable of servicing even smaller crystals within small arrays. For example, instead of being usable with crystals of 5 mm wide, the present invention is useable with crystals equal to or less than 2.5 mm wide. A resulting increase in resolution is thereby achieved.

The present invention is also directed to a method of detecting the location and size of neoplasms or tumors within a patient. The method comprises the steps of receiving gamma rays from a patient upon four adjacent arrays of scintillation crystals. The gamma rays striking four adjacent quadrants of four separate blocks or arrays are then converted to photon energy which is then partially detectable by a light detector. The tumor location can be isolated according to the proportion of photon energy detectable by the detector in relation to remaining photon energy detectable by adjacent light detectors.

BRIEF DESCRIPTION OF THE DRAWINGS

Other objects and advantages of the invention will become apparent upon reading the following detailed description and upon reference to accompanying drawings in which.

Figure 1:
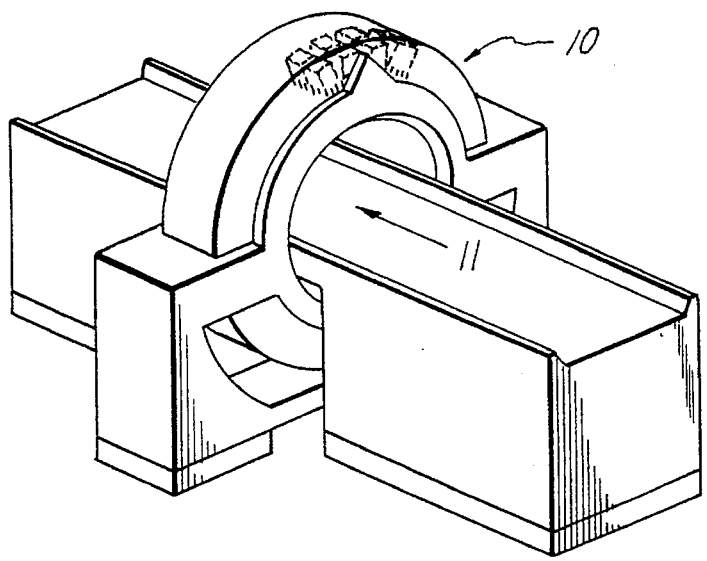
FIG. 1 is a perspective elevational view of a PET camera.
Figure 2:
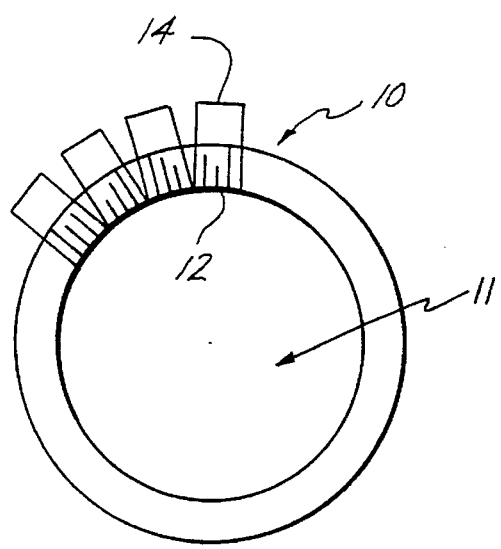
FIG. 2 is a schematic cross-sectional view of one plane of crystals and light detectors of a conventional PET camera.
Figure 3:
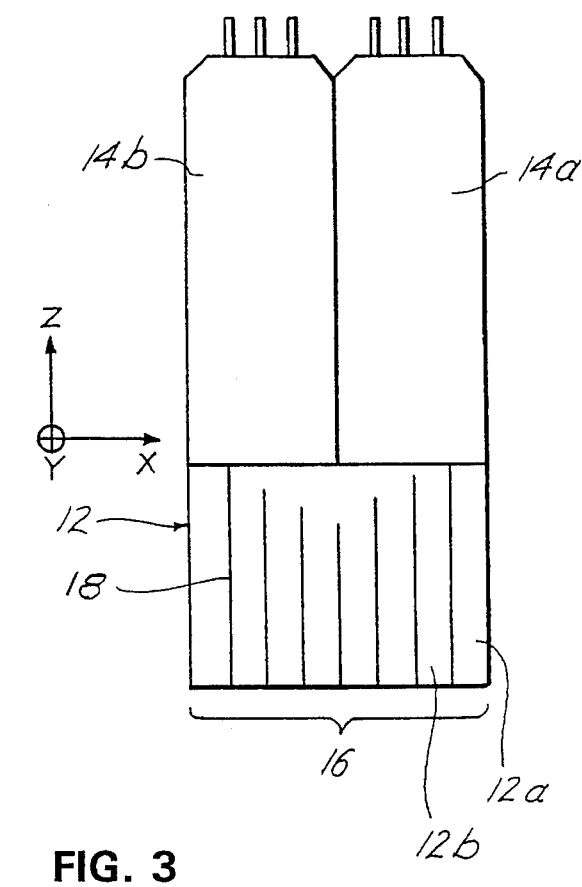
FIG. 3 is a perspective elevational view of one row of crystals placed adjacent to light detectors in a non-offset configuration of a conventional PET camera design.

While the invention is susceptible to various modifications and alternative forms, the specific embodiments thereof have been shown by way of example in the drawings and will herein be described in detail. It should be understood, however, that the drawings are not intended to limit the invention to the particular form disclosed, but on contrary, the intention is to cover all modifications, equivalents and alternatives falling within the spirit and scope of the invention as defined by the appended claims.

DETAILED DESCRIPTION OF THE INVENTION

In a PET camera, a positron isotope, such as Rb82, F-18-deoxyglucose tracer (FDG) or thymidine, is injected into a patient and each positron isotope atom then produces two gamma rays moving in opposite directions. The detector ring then captures these gamma rays to produce an image of the isotope tracer distribution. Various forms of positron isotope may be used in the present invention. Generally, the desired isotope has a fairly short half-life. Such isotopes typically lose half of their radioactivity within minutes or hours of creation. As such, PET scanning must occur soon after injection of the isotope.

By arranging the detector ring about the patient's body, location of each energy flash arising from the positron-electron annihilation can be recorded along a plane between the ring of detectors. Thus, two-dimensional slice diagrams of the flash point can be produced indicating the area of interest.

Figure 5:
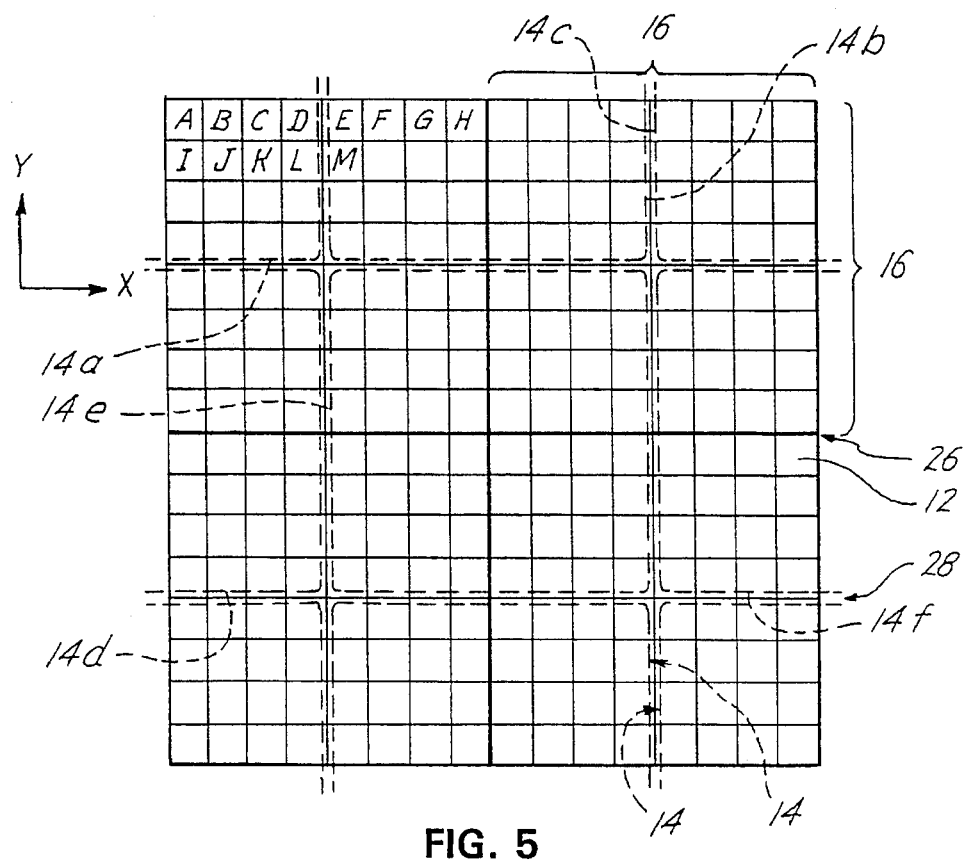
FIG. 5 is a schematic view of crystals and light detectors arranged according to the present invention.

Turning now to the drawings, FIG. 5 illustrates a plurality of crystals 12 arranged in an array 16. Each array may comprise numerous crystals arranged in a matrix. As an example, each array may include sixty-four crystals arranged in an 8×8 matrix. Each array 16 of crystals 12 can be configured to occupy one quadrant of four adjacent light detectors or PMTs 14. Each PMT 14 can thereby be placed adjacent four adjacent quadrants of four respective arrays 16 (one quadrant from each of four arrays). Each array quadrant is selected from four different arrays. The resulting crystal/PMT configuration ensures that edges 26 of each array 16 are not immediately adjacent to the PMT edges 28. The edges between PMTs and the edges between crystal arrays 16 are therefore offset from each other to allow a single PMT to detect light from each of four crystal arrays.

Crystals 12 may be of any suitable type, such as BGO or light-output-equivalent crystals, and a suitable light detector 14 may be a photomultiplier tube or silicon photodiode. According to one aspect of the present invention, individual crystals are selectively bonded. Each crystal may be cut from a large crystal ingot of scintillation material. The resultant crystal can be tested to ensure its compatibility with adjacently placed crystals so that the performance of the resulting array is consistent throughout the array and between adjacent arrays. The separate crystals can be selectively coupled (i.e., glued or banded) together with substantially no gaps therebetween to form a block or array of crystals.

An advantage in cutting separate crystals from a large chunk of crystal material is that the resulting separate crystal can be mixed and matched with adjacent crystals to optimize performance of the detector. It is important that the crystals within a block are internally arranged so that their characteristic performance remains consistent between adjacent crystals in that block. Moreover, manufacture of separate crystals can be more cost efficient. For example, if crystals of 2 mm thickness are cut from a bulk material of 15 mm thickness, seven crystals can be formed (with 1 mm waste) and five crystals coupled adjacent each other to form a block of 10 mm thickness. The remaining two crystals can be added to an adjacent block. Conversely, if a block of 10 mm thickness is cut from the bulk material of 15 mm thickness, 5 mm crystal is left as waste. A further advantage of using separate crystals, rather than crystals formed between cuts within a block, is that tightly bonded crystals do not have a gap or groove at the detector surface.

Therefore, according to one aspect of the present invention, the crystals in the detector arrays are not formed by cuts in a block. Instead, the present crystals are formed separately from an ingot and then selectively bonded to form an array. The resulting array does not have grooves left by the cutting blade width used in forming the slits for cuts between adjacent crystals as in conventional design. Instead, grooves (which are typically 0.3–0.4 mm) are eliminated by close adhesive bonding of separate crystals, thereby increasing the detection surface area of the array. Moreover, the surface area of adjacent crystals can be selectively polished to optically cross-couple the crystals within the array. Cross-coupling determines the degree of optical cross-talks. To control the light distribution within the array, different cross-coupling optical adhesives are used within an array to fine tune the light distribution to an adjacent PMT.

Figure 6:
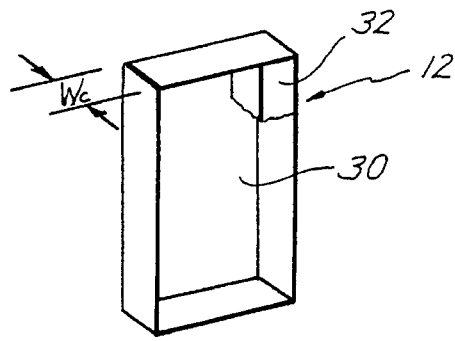
FIG. 6 is an enlarged perspective elevational view of a crystal with a polished surface finish and partially coated with radiation transparent adhesive according to the present invention.

Illustrated in FIG. 6 is a single crystal 12 cut from a bulk chunk of crystal material. The crystal may have one or more selected sides polished to modulate the amount of light allowed to pass through the polished surface and into an adjacent crystal also may or may not have an adjacent polished surface 30. Not all sides need be polished. Instead, one or more sides may have selected frosted finish placed thereon so as to selectively modulate the-amount of light being transmitted therethrough. The desired light distribution is determined by the location and degree of polish and/or the location and degree of light controlling adhesive placed at the adjacent surfaces of crystals. Typically, resolution of the PET scanner is determined by the width of each crystal 12. Width, $W_c$, shown in FIG. 6 can range anywhere from 1–4 mm.

One or more sides of a selected crystal 12, or a partial side of a select crystal 12, may have a light transmitting adhesive 32 placed thereon. Adhesive 32 allows close bonding of adjacent crystals 12. Within an array 16, adhesives 32 of different refractive index may be used on different cross-coupling surfaces to provide additional light distribution control. Hence the cross-coupling finish and adhesive type will direct the photon energy between crystals 12 to adjacent PMTs associated with the array.

Figure 7:
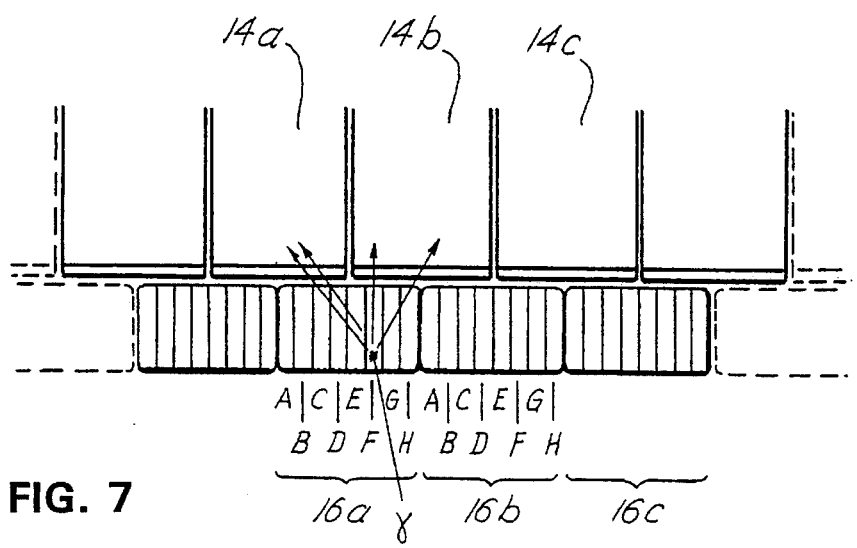
FIG. 7 is a row of crystals and light detectors arranged in a plane according to the present invention.

Referring to FIG. 7, a planar geometry of multiple arrays 16 are placed adjacent PMTs 14a–14c. A gamma ray is shown striking crystal G of array 16a. The resulting photon energy can be dispersed throughout the array and into PMT 14a and PMT 14b, depending upon the location of polished surfaces and light transmissive adhesives placed between crystals A–H of array 16a.

Figure 10:
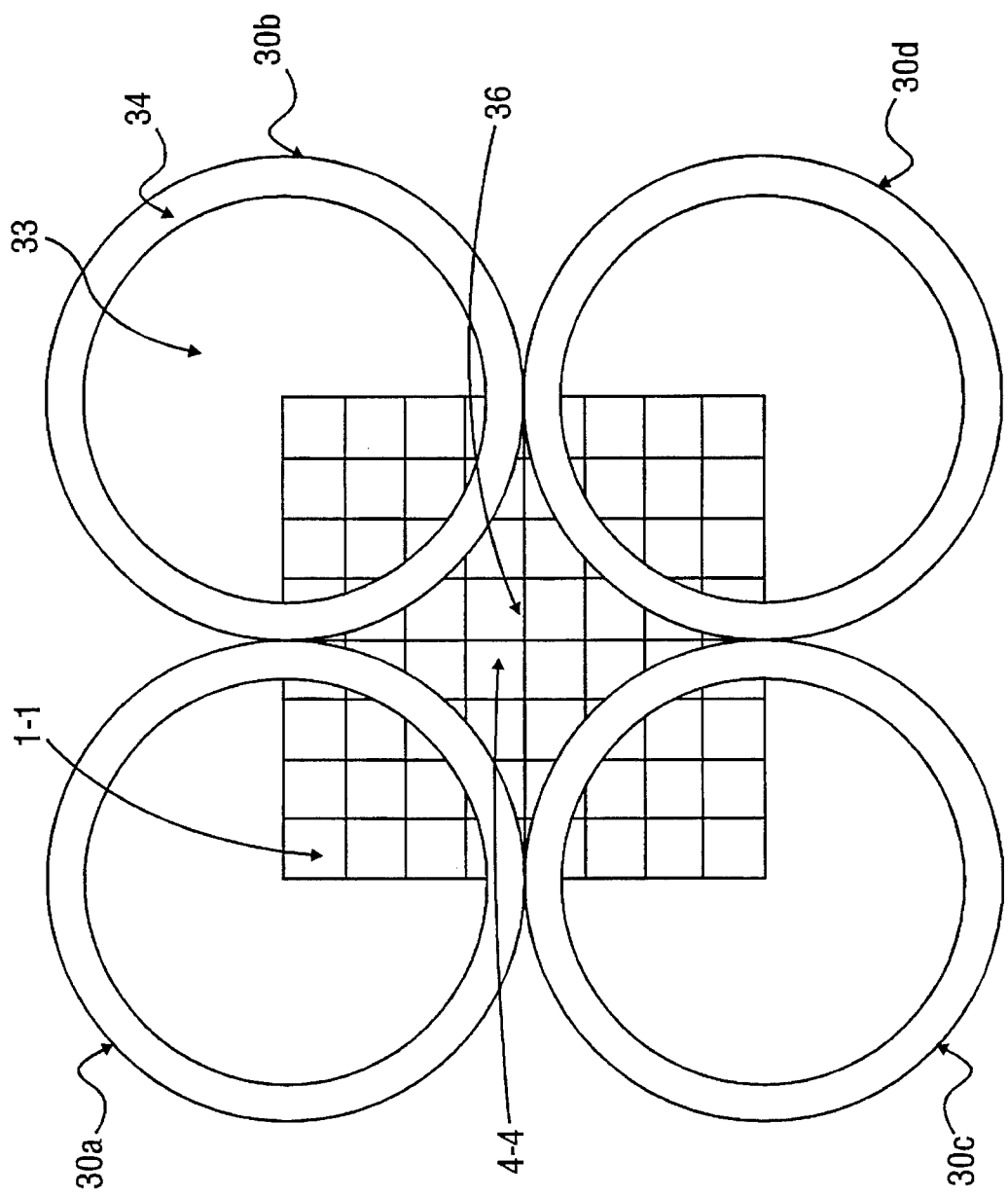
FIG. 10 is a schematic view of crystals and circular PMTs arranged in an offset configuration according to the present invention.

Turning now to FIG. 10, PMTs 30 have dead surface area which is not sensitive to light such as the glass side wall 34 of the tube 30b. Photon energy incident on the dead area will be absorbed and will not be registered as being detected. Thus, it is important that photon energy be directed away from the dead areas. This is done through selective placement of the polished surfaces and adhesives at thee interface between crystals. Moreover, by offsetting the dead area (PMT wall) from the edge of the array, more flexibility is gained in directing the photon energy away from the dead area. If, for example, a gamma ray scintillates the last row or "end" crystal arranged in a non-offset pattern with the PMT (as in conventional designs), then a substantial portion of scintillation energy is lost when the edge absorbs the resulting photon energy. Conversely, by offsetting the edge of the array from the PMT dead area, as herein described, the crystal interface of the central crystals can be selectively polished and glued to direct the photon energy away from the adjacent dead area. For example, the noncovered area 36 in between PMTs 30a, 30b, 30c, and 30d may be made reflective to bounce incident light back for redistribution to other crystals in the arrays.

In the offset configuration of the present design, all resulting crystal elements have substantially the same optical efficiency. Namely, gamma rays which strike any crystal within an array produce approximately the same amount of detectable photon energy regardless of where scintillation occurs. As opposed to conventional, non-offset designs which experience lesser optical efficiency at the edge of the array (due to adjacent dead area), the offset design herein can compensate or direct detectable energy away from the dead area to achieve substantially uniform efficiency across the entire array surface.

Figure 11:
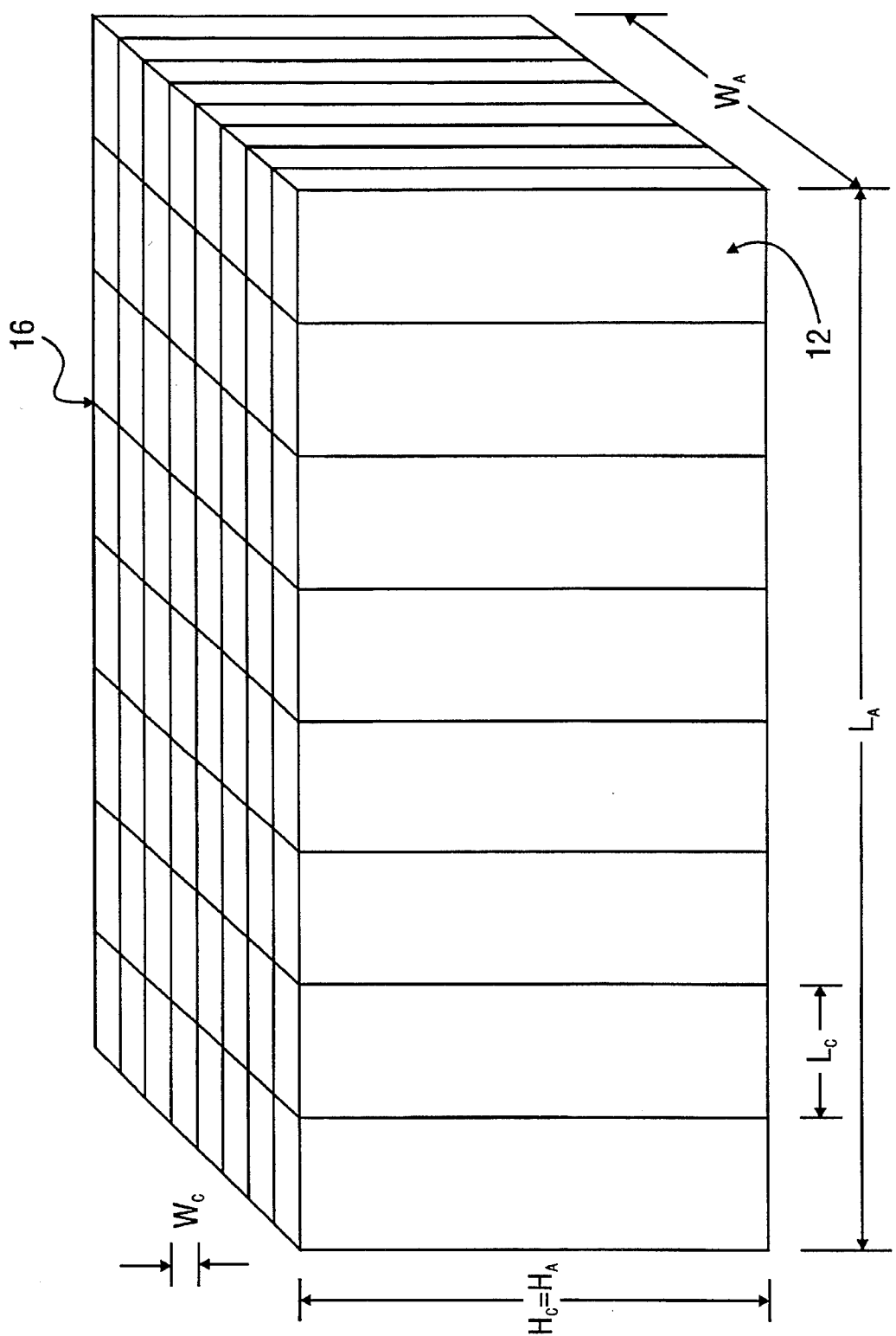
FIG. 11 is a perspective view of a detector array according to the present invention.
Figure 12:
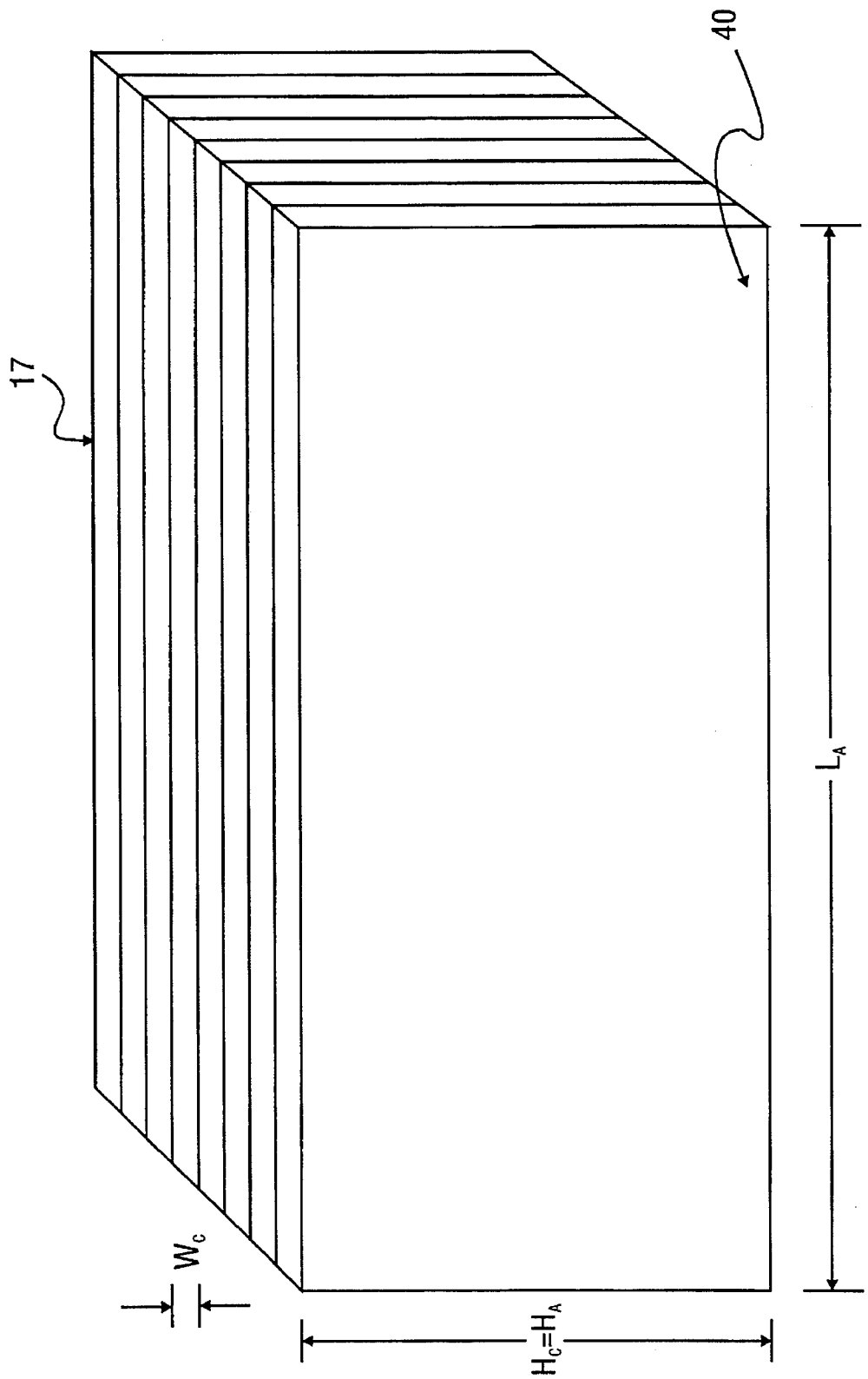
FIG. 12 is a perspective view of a "pre-array" with glued crystal slabs according to the present invention.

Because the cost of assembling thousands of individual crystals into the multiple 8×8 arrays needed for a PET camera may be prohibitively high, slabs of cut crystals are used according to another aspect of the present invention. To form the detector array of cut crystals, slabs 40 of crystals are cut, as shown in FIG. 12. The thickness $W_c$ of each slab cut is equal to the smallest dimension of the desired crystal (e.g., 1.5 mm for the crystal sizes discussed herein). For an 8×8 array 16, as shown in FIG. 11, eight of these slabs 40 are then stacked so that the stack forms the "pre-array" 17 shown in FIG. 12 with the same dimension as the desired final array (e.g., $W_A \times L_A \times H_A = 12 \times 24 \times 10$ mm for the arrays discussed herein).

It is desired according to the present invention that each of the interfacing surfaces of the slabs be selectively optically treated, such as by roughing the surfaces, polishing them, painting them white, or by blocking them with very thin white materials using single or multiple strips uniformly across the whole slab along the dimension that is parallel to the axis of the camera/patient. A small curvature in the paint boundary may be included to allow more light leak near the edge of the slab (from one slab to the next). The general depth of the white barrier (or paint) varies from interface to interface for optimal crystal decoding.

Figure 13:
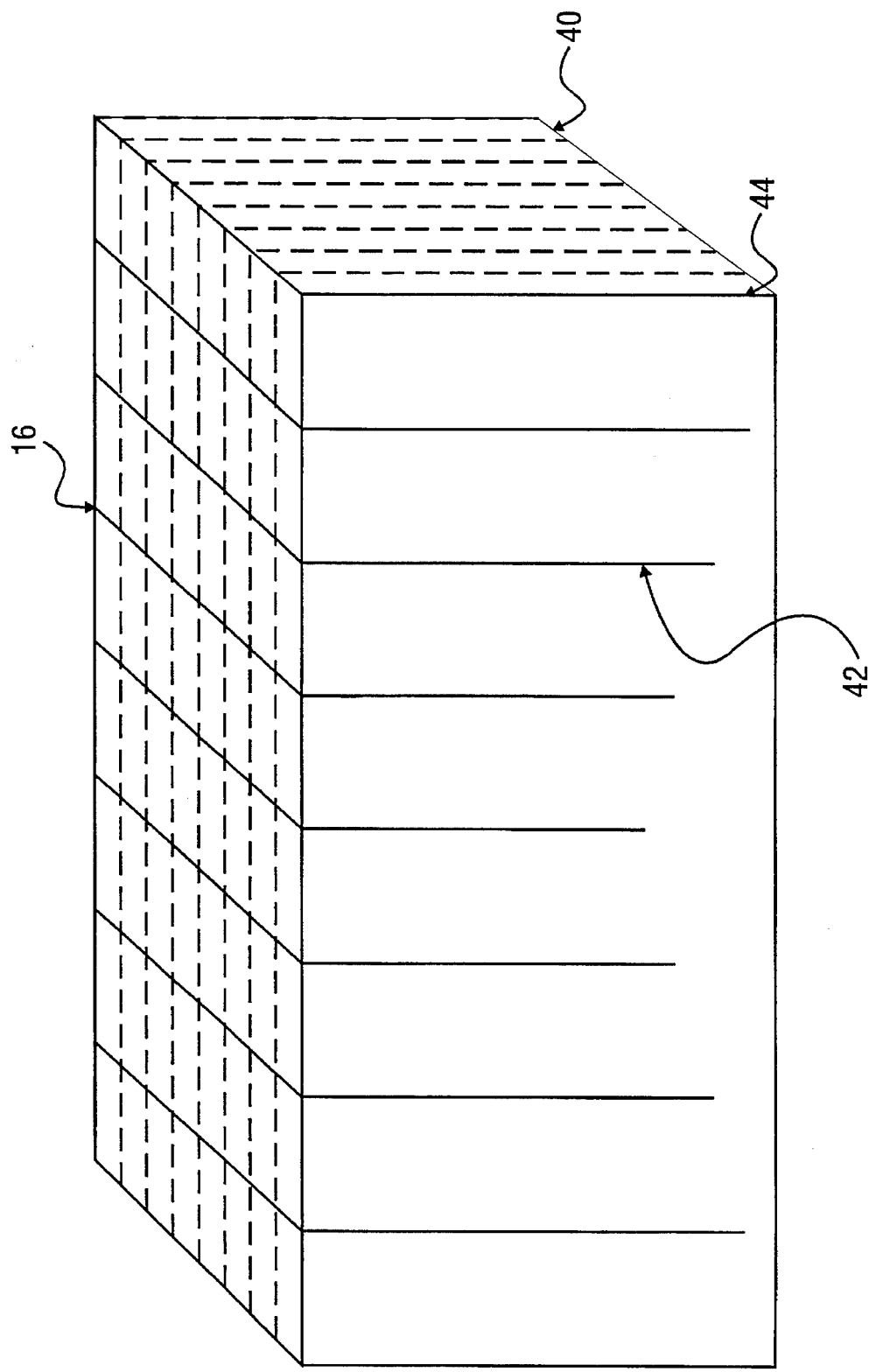
FIG. 13 is a perspective view of a cross-cutting pattern across the "pre-array" of crystal slabs according one embodiment of to the present invention.

Once the slabs have been optically treated as desired, the slabs are optically glued rigidly together with a light controlling adhesive to complete the "pre-array" 17, which is shown in FIG. 12. The final array 16 may be formed by cutting slabs 40 in pre-array 17 from the same side of the pre-array, as illustrated in FIG. 13, wherein the slabs are cross-cut by a thin saw assembly to make the final array with uniform or varying depth, as desired to control the light leak across the cut 42. All cuts 42 may be made simultaneously in one pass with a custom-made saw assembly with multiple blades. The final arrays thus each comprise crystal slabs 40 optically coupled together with a light controlling adhesive along a first axis, with spaced cuts 42 across the slabs 40 at uniform or varying depths along a second, perpendicular axis.

The one-dimensional cutting method is similar to the

Figure 14:
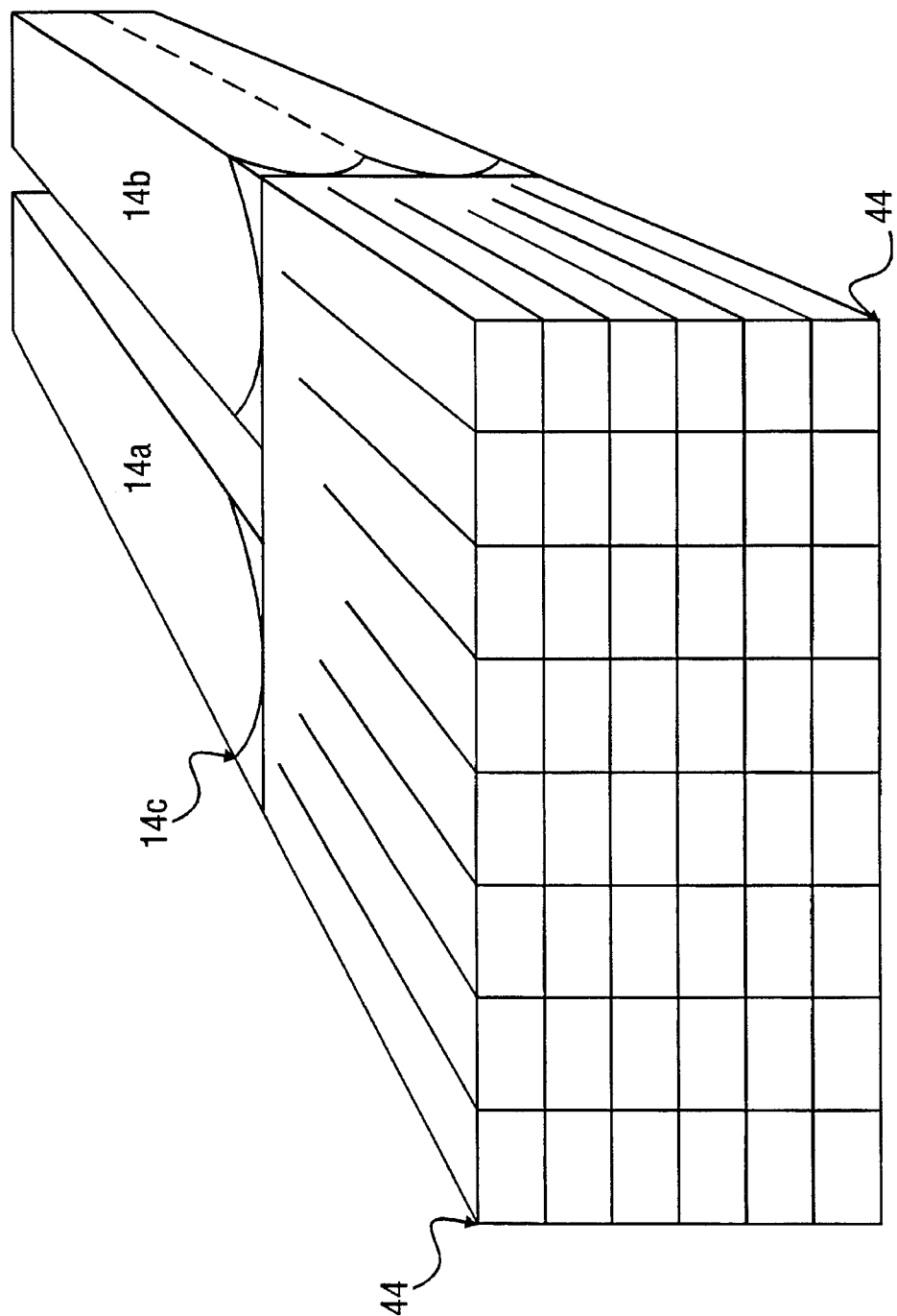
FIG. 14 is a perspective view of a prior art Siemens two-dimensional cutting pattern.

Siemens CTI design, which uses cutting to control light distribution in two dimensions, as shown in FIG. 14. (An 8×6 array is shown in FIG. 14 with four PMTs 14A, 14B, 14C, and 14D.) However, the two-dimensional cutting is difficult for use in creating high-resolution arrays with very small detecting crystals because the corner crystals 44 can be broken easily from the array. This is especially true during the cutting process because the corner crystals are held on by a very small amount of the very brittle crystal material. The single-dimension cutting method of the present invention, in contrast, is more rigid because one dimension is optically glued together. The corner crystals are thus solidly glued in one dimension to prevent breaking from the array.

Figure 13A:
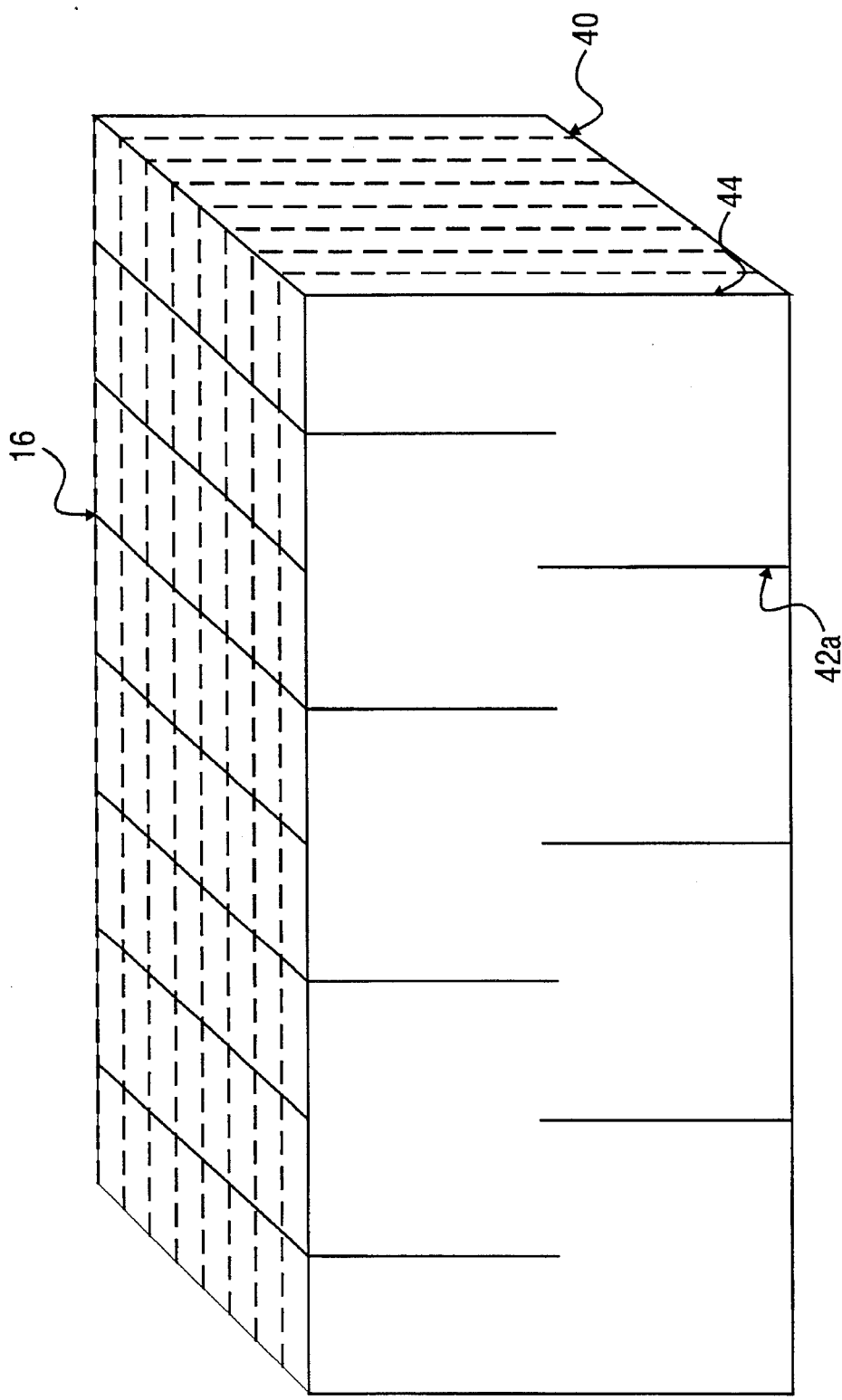
FIG. 13A is a perspective view of a alternating opposite-cutting pattern across the "pre-array" of crystal slabs according to another embodiment of the present invention.

Alternatively, the cuts in the "pre-array" 17 may be made from both the top and bottom of the array, as shown in FIG. 13A. Cuts 42a may be made in an "opposite cutting" scheme wherein the cuts are made from the top and bottom of pre-array 17 in an alternating pattern. This scheme has the advantage that the optical path (or transmittance) to the furthest PMT may be made restrictive without making the cuts too deep. Deep cuts, especially near the end of the array, may result in breakage of the array because too little material is left to hold the crystals to the array. Further, initiating all of the cuts from the same side of the array results in less material to hold the crystals to that side of array. With alternating cutting, the resulting array is mechanically stronger.

Further optical control may be achieved by using optical barriers in the cut grooves 42 of FIG. 13. For example, a filler material, such as white barrier paint, white powder or white cement, may be poured into the saw-cut grooves. This material, once set, will further reinforce the rigidity of the array. If the arrays are large and mechanically rigid, flexible fillers may be used. However, if the array is small and fragile, solid fillers are preferred. An air gap may be left between the filler material and neighboring crystals to improve the reflection efficiency. Hence, light distribution throughout the array is controlled in one dimension by optical treatment/barrier (slab interface), while the other dimension is controlled by the saw cut.

A second advantage of the method of the present invention over the Siemens saw cut method is that a higher positron-detection sensitivity may be achieved with the present invention. The narrowest grooves that may be cut are about 0.4 mm. In the present high-resolution design, the in-plane detector width (detector separation) is only about 1.5 mm. The cutting grooves thus will cause a loss of detection space by $0.4/1.5$, or 27%, which will in turn yield a final positron-detection sensitivity of 0.73×0.73=53%. The present invention, in contrast, uses paint (or other thin barrier), which may have a thickness of less than 0.1 mm. This leads to a sensitivity of $(1-0.1/1.5)^2 = 87\%$. Hence, the present invention may achieve a higher detection sensitivity over the Siemens design by $87/53=64\%$ increase. Moreover, because in the present invention the saw cut is preferably used only in the image slice thickness dimension (which is generally much larger than the in-plane detector width), the fractional cutting loss is more tolerable.

Referring to FIG. 5, each PMT 14 can be made approximately the same size as the array 16 of crystals 12 (shown with 64 crystals in FIG. 5). Large PMTs can achieve accurate detection of scintillation within a scintillating crystal 12 by offsetting the edges between PMTs from the edges between each array. For example, if crystal H is scintillated, then photon energy will be detected in PMTs 14a, 14b, 14d and 14e. Photon energy is preferably directed across the entire array surface (between crystals of an array) since the array or block of the present invention utilizes light transmissive material placed between adjacent crystals within an array. Scintillation of crystal H will record more photon energy in PMT 14b than in the other three PMTs associated with the array.

The relative proportion of photon energy recorded in each of the four array-sharing PMTs determines the X and Y location of scintillation within a given crystal 12. For example, if crystal M is scintillated, PMT 14b will record a majority of the photon energy, PMT 14a will read more energy than PMT 14e, and PMT 14d will read the least amount of energy. Accordingly, the relative proportion of energy indicates a fairly precise location of scintillation within each crystal within the array. A simple algorithm can be used to convert the relative proportion of photon energy recordable in four array-sharing PMTs into a two-dimensional location of the scintillating crystal.

Instead of placing the entire PMT adjacent a quadrant of each array, as in conventional detectors, the present invention can increase the size of each PMT relative to the array such that each PMT can service all four quadrants of four different arrays simultaneously. Placement adjacent four quadrants allows a PMT to equal the size of an entire array. The array can have a dimension equal to or greater than 6×6 crystals or 36 crystals. Alternatively, instead of increasing the PMT size (and thereby reducing cost) the present invention can utilize smaller crystals for higher resolution applications.

Figure 4:
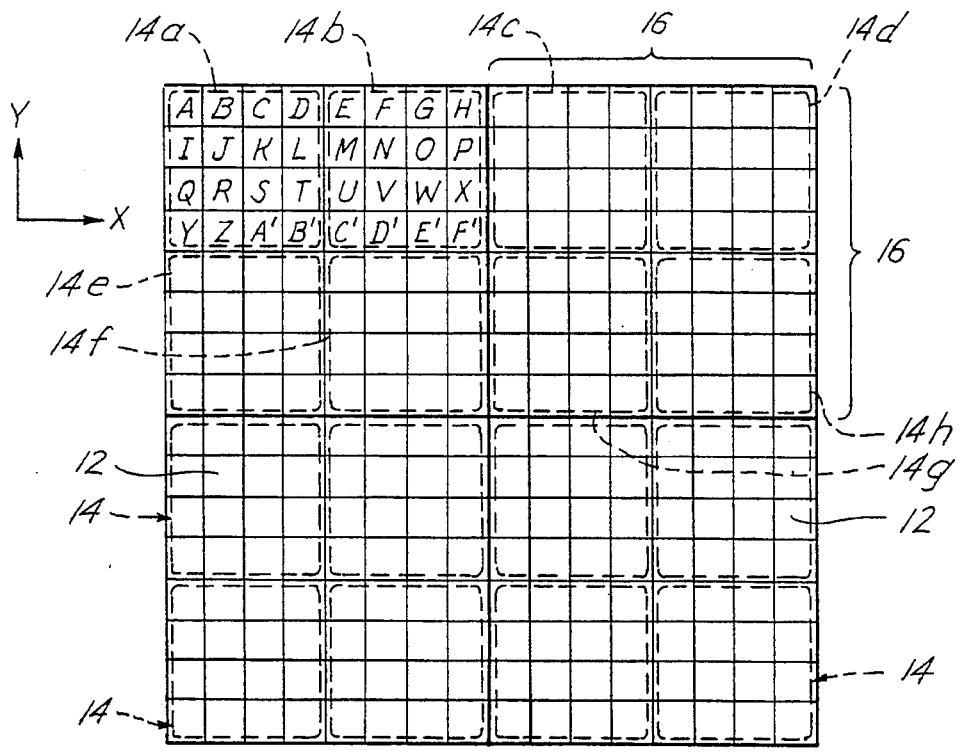
FIG. 4 is a schematic view of crystals and light detectors arranged according to a conventional PET camera design and shown along a plane perpendicular to the viewing plane of FIG. 3.
Figure 9:
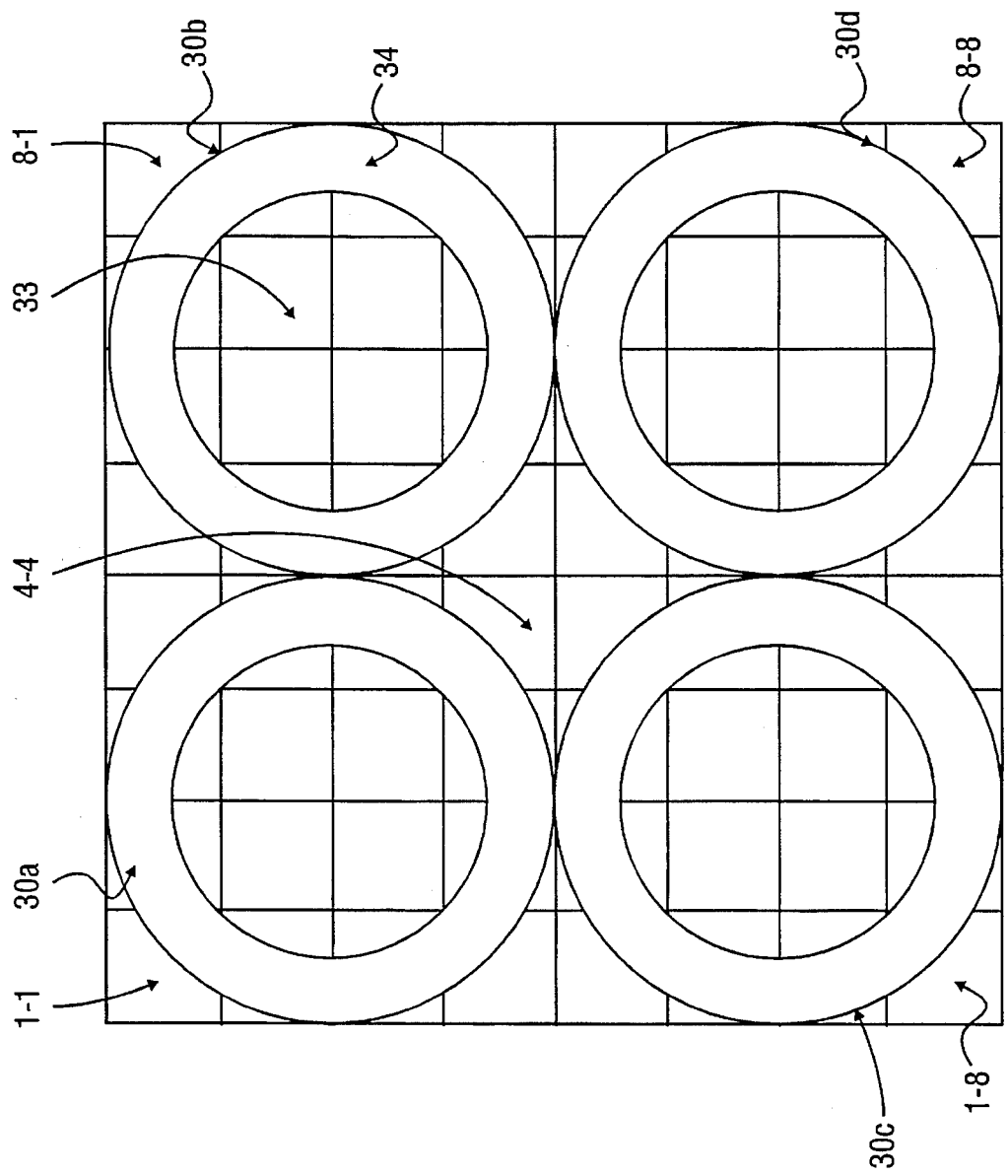
FIG. 9 is a schematic view of crystals and circular PMTs arranged according to a conventional PET camera design.

In place of the square PMTs shown in FIGS. 4 and 5, circular PMTs may be used, as shown in FIG. 10. The offset design of the present invention obviates the problems associated with circular PMTs in prior art detector designs, as discussed above. As shown in FIG. 10, the corner crystal 1-1 is now sitting at the center of PMT 30a designated to receive the majority of light, and has no coverage problems as noted for the configuration of FIG. 9. The center crystal 4-4 also has no detection problems because its light is to be distributed through the neighboring crystals to all four PMTs 30a, 30b, 30c, and 30d. The noncovered empty space 36 may be treated with optically reflective material to redistribute light into PMTs 30a, 30b, 30c, and 30d.

Figure 15:
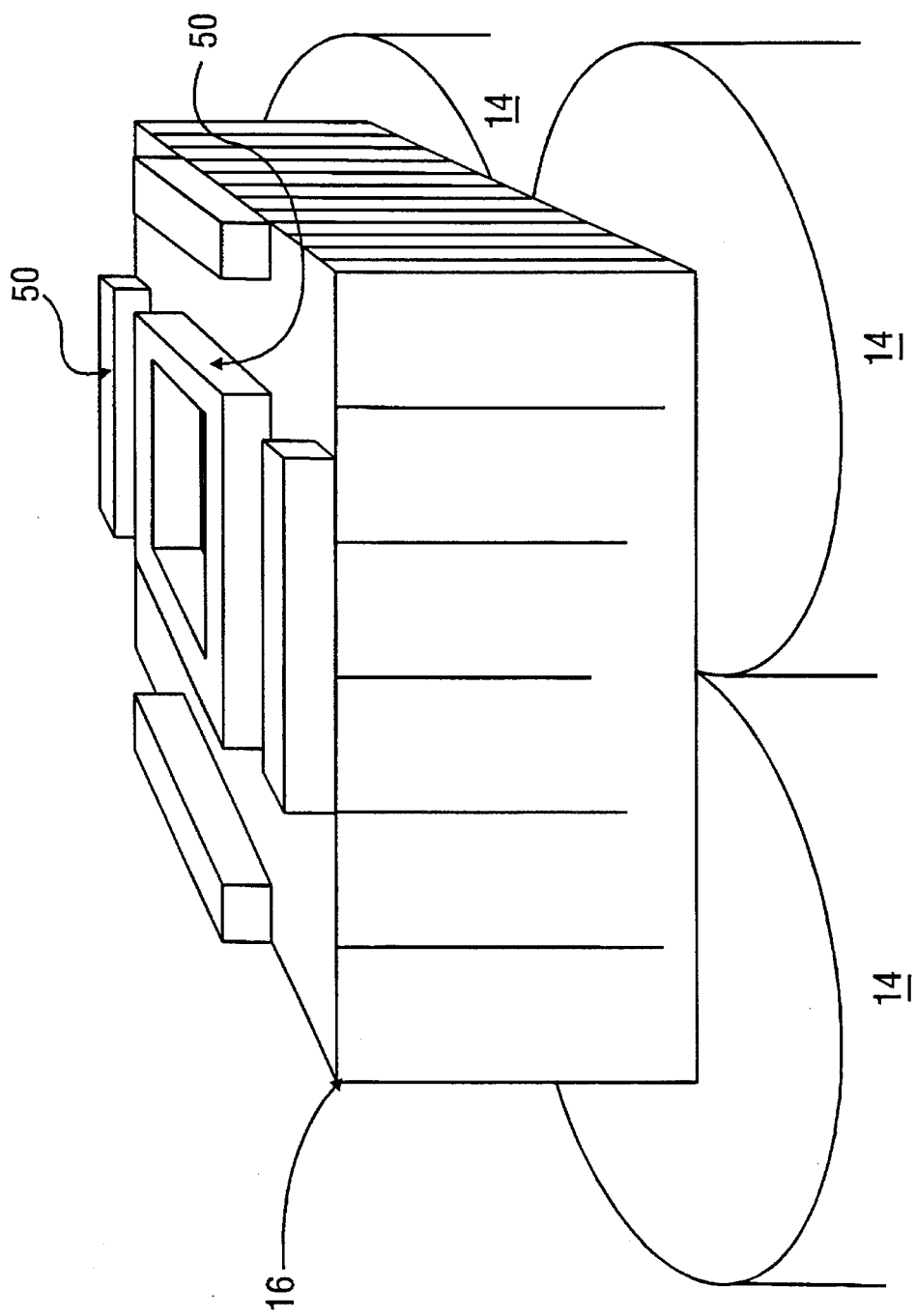
FIG. 15 is a perspective view of optically transparent jumpers coupled to a crystal array to correct for decoding distortion according to the present invention.

To compensate for decoding distortion common to analog decoding detector designs, and particularly with circular PMTs, jumpers 50 may be coupled to the free end of array 16 (e.g., the end opposite PMTs 14), as shown in FIG. 15. Jumpers 50 may be of a variety of shapes, including rectangular, circular, square, etc. Jumpers 50 are optically transparent, and may be made from materials such as glass or Plexiglas.™ To avoid light leakage to the outside of the system, the back and side surfaces of jumpers 50 may be optically treated (such as with white barrier paint, etc.).

Figure 8:
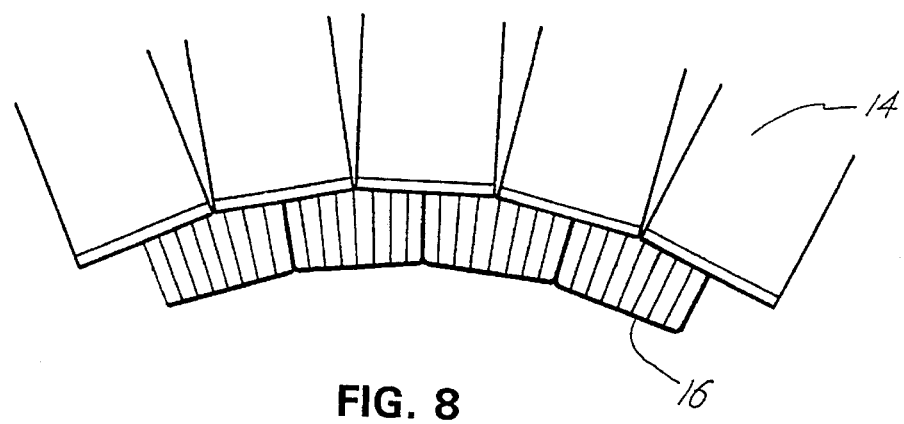
FIG. 8 is a row of crystals and light detectors arranged in an arcuate path according to the present invention.

FIG. 8 illustrates a plurality of arrays or blocks 16 of crystals 12 placed adjacent a plurality of PMTs 14. The arrays 16 and PMTs 14 can be situated in an arcuate pattern, or curved pattern, which can completely encircle back upon itself to form a ring usable in a PET camera. The resultant ring can produce a series of planar images necessary to produce a three-dimensional diagram of the target area. Conversely, if arrays 16 and PMTs 14 are placed in a pair of planes arranged on opposing sides of a patient area, a two dimensional image may be formed of the target area. Two planar detectors placed on opposing sides of the target area are advantageously suited for quick detection of a neoplasm site at various locations within the patient's body. Two-dimensional detection using opposing planar surfaces can be performed independent of, or in conjunction with, three-dimensional detection using a ring of detectors.

Figure 16:
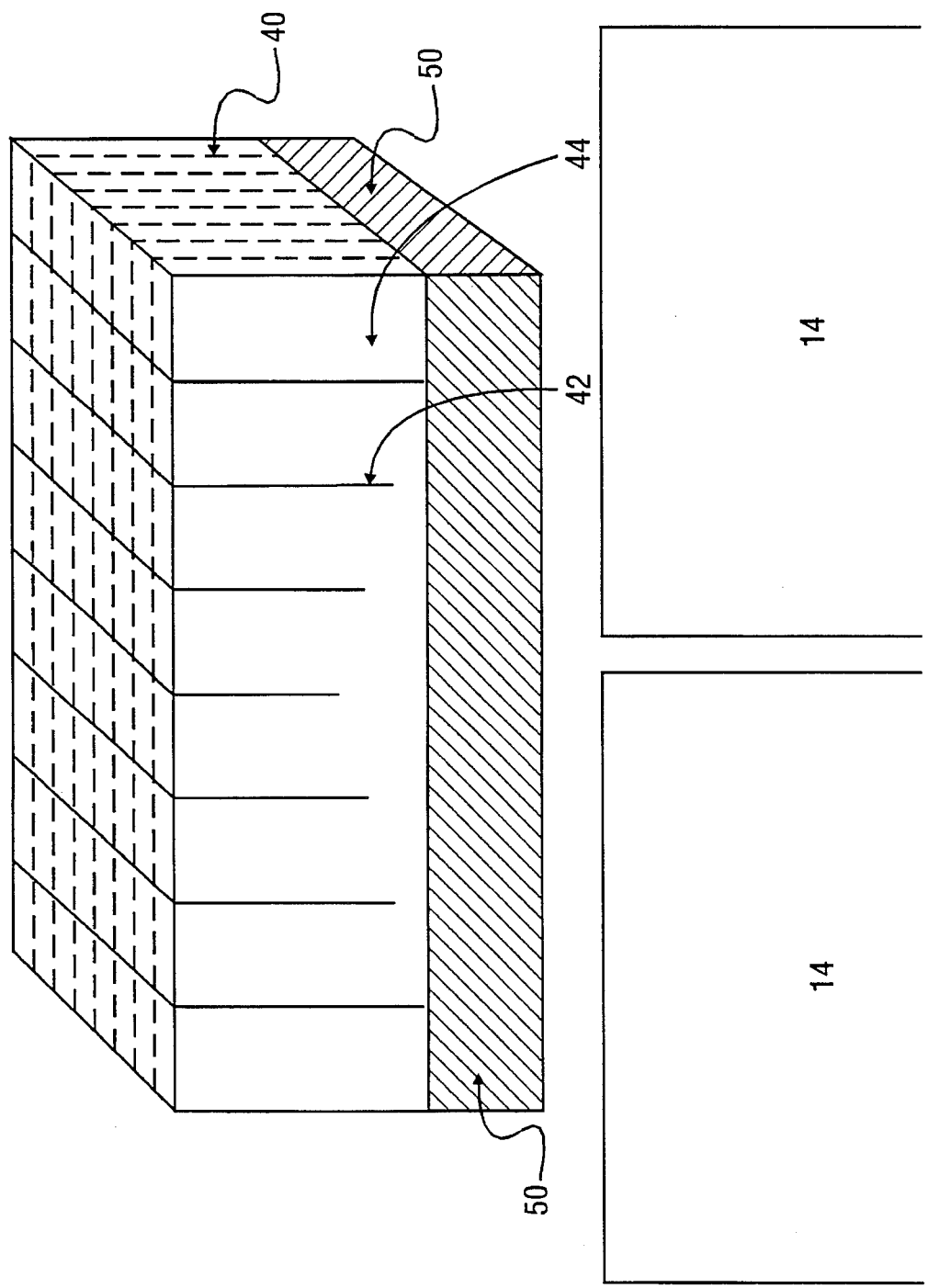
FIG. 16 illustrates an array of crystals rimmed with black material to improve decoding resolution of the edge and corner crystals according to the present invention.

Decoding resolution for edge and corner crystals within an array may also be improved with a rim of black material, such as black paint 60, placed near the lower edge of the crystal array 16 relative to PMTs 14, shown in FIG. 16.

The foregoing description of the present invention has been directed to particular preferred embodiments. It will be apparent, however, to those skilled in the art that modifications and changes in both apparatus and method may be made without departing from the scope and spirit of the invention. For example, larger PMTs of approximately two inches square can be combined with crystals cut at a width of approximately 5–6 mm so as to reduce the number of PMTs and thereby lower the production costs of the PET camera. Conversely, a larger number of PMTs of smaller geometry (e.g., one inch square) can be combined with smaller crystals of approximately 2.4 to 2.8 mm to produce a higher resolution PET camera necessary for detecting small neoplasm function for tumor activity. By offsetting the edges of the crystal arrays with the edges of the PMTs, the present invention may achieve a PMT equal in size to an array. The present invention, therefore, is well adapted to increase the PMT/array (or block) size ratio, and to also increase the efficiency of the detector surface. Numerous changes in the details of construction and arrangement of parts will be readily apparent to those skilled in the art, and which are encompassed within the spirit of the invention and the scope of the appended claims.

What is claimed is:

1. A positron emission tomography camera comprising:
   a plurality of arrays of scintillation crystals placed in an arcuate position with adjacent arrays and adapted to surround a patient area; and
   a plurality of circular photomultiplier tubes positioned adjacent said plurality of arrays, each light detector being adjacent one quadrant of each of four adjacent arrays.

2. The apparatus as recited in claim 1, wherein each array comprises at least thirty-six scintillation crystals.

3. The apparatus as recited in claim 2, wherein said crystals are BGO or light-output-equivalent crystals.

4. The apparatus as recited in claim 1, wherein said crystals are separate from each other and closely bonded together by a light controlling adhesive selectively placed between selected scintillation crystals.

5. The apparatus as recited in claim 1, wherein said arrays each comprise crystal slabs optically coupled together with a light controlling adhesive along a first axis, said slabs having spaced cuts with varying depths along a second, perpendicular axis.

6. The apparatus as recited in claim 5, wherein said cuts are all initiated from the same face of each said array.

7. The apparatus as recited in claim 5, wherein said cuts are initiated from opposite faces of each said array in an alternating pattern.

8. The apparatus as recited in claim 5, further comprising a light reflective barrier placed between at least two said slabs.

9. The apparatus as recited in claim 1, further comprising at least one optically transparent jumper coupled to a face of at least one said array remote from said photomultiplier tubes.

10. The apparatus as recited in claim 1, wherein at least a portion of a face of at least one said array is treated with optically reflective material.

11. The apparatus as recited in claim 1, wherein a face of at least one said array is rimmed with black material adjacent said photomultiplier tubes.

12. A positron emission tomography camera comprising:
   first and second planar members arranged on opposing sides of a patient area, each planar member including a plurality of adjacent arrays of scintillation crystals; and
   a plurality of circular photomultiplier tubes positioned adjacent said plurality of arrays in each planar member, each light detector being adjacent one quadrant of each of four adjacent arrays.

13. The apparatus as recited in claim 12, wherein each array comprises at least thirty-six scintillation crystals.

14. The apparatus as recited in claim 13, wherein said crystals are BGO or light-output-equivalent crystals.

15. The apparatus as recited in claim 12, wherein said crystals in each said array are separate from each other and closely bonded together by a light controlling adhesive selectively placed between selected scintillation crystals.

16. The apparatus as recited in claim 12, wherein said crystals in each said array comprise crystal slabs optically coupled together with a light controlling adhesive along a first axis, said slabs having spaced cuts with varying depths along a second, perpendicular axis.

17. The apparatus as recited in claim 16, wherein said cuts are all initiated from the same face of each said array.

18. The apparatus as recited in claim 16, wherein said cuts are initiated from opposite faces of each said array in an alternating pattern.

19. The apparatus as recited in claim 16, further comprising a light reflective barrier placed between at least two said slabs.

20. The apparatus as recited in claim 12, further comprising at least one optically transparent jumper coupled to a face of at least one said array remote from said photomultiplier tubes.

21. The apparatus as recited in claim 12, wherein at least a portion of a face of at least one said array is treated with optically reflective material to distribute light away from dead areas of said photomultiplier tubes.

22. The apparatus as recited in claim 12, wherein a face at least one said array is rimmed with black material adjacent said photomultiplier tubes.

23. A positron emission tomography camera comprising:
   a plurality of adjacent arrays of scintillation crystals configured to enclose a patient area,
   wherein said arrays each comprise a plurality of crystal slabs optically coupled together with a light controlling adhesive along a first axis, said slabs having a plurality of spaced cuts with varying depths along a second, perpendicular axis to form an array of crystals; and
   a plurality of light detectors positioned adjacent said plurality of arrays, each light detector being adjacent one quadrant of each of four adjacent arrays,
   wherein each light detector is adapted to convert received light from said four adjacent arrays to an electrical signal in proportion to a location within each array from which said light is emitted.

24. The apparatus as recited in claim 23, wherein said cuts are all initiated from the same face of each said array.

25. The apparatus as recited in claim 23, wherein said cuts are initiated from opposite faces of each said array in an alternating pattern.

26. The apparatus as recited in claim 23, further comprising a light reflective barrier placed between at least two said slabs.

27. The apparatus as recited in claim 23, wherein selected said crystals in selected said arrays have at least one polished surface.

28. The apparatus as recited in claim 23, wherein the surface of each slab interior to each said array is optically treated to reflect incident light for redistribution to adjacent areas of said array.

29. The apparatus as recited in claim 23, wherein said light detectors comprise circular photomultiplier tubes.

30. The apparatus as recited in claim 23, further comprising at least one optically transparent jumper coupled to a face of at least one said array remote from said light detectors.

31. The apparatus as recited in claim 23, wherein at least a portion of a face of at least one said array is treated with optically reflective material.

32. The apparatus as recited in claim 23, wherein a face of at least one said array is rimmed with black material adjacent said photomultiplier tubes.

* * * * *